No. 805,179. PATENTED NOV. 21, 1905.
R. ZASTROW.
CABBAGE CORE SLICER.
APPLICATION FILED APR. 10, 1905.

Witnesses.
J. H. Shumway
Clara L. Weed.

Richard Zastrow.
Inventor.
By Atty Seymour & Earle

UNITED STATES PATENT OFFICE.

RICHARD ZASTROW, OF NEW HAVEN, CONNECTICUT.

CABBAGE-CORE SLICER.

No. 805,179. Specification of Letters Patent. Patented Nov. 21, 1905.

Application filed April 10, 1905. Serial No. 254,760.

*To all whom it may concern:*

Be it known that I, RICHARD ZASTROW, a citizen of the United States, residing at New Haven, in the county of New Haven and State of Connecticut, have invented a new and useful Improvement in Cabbage-Core Slicers; and I do hereby declare the following, when taken in connection with the accompanying drawings and the numerals of reference marked thereon, to be a full, clear, and exact description of the same, and which said drawings constitute part of this specification, and represent, in—

Figure 1:
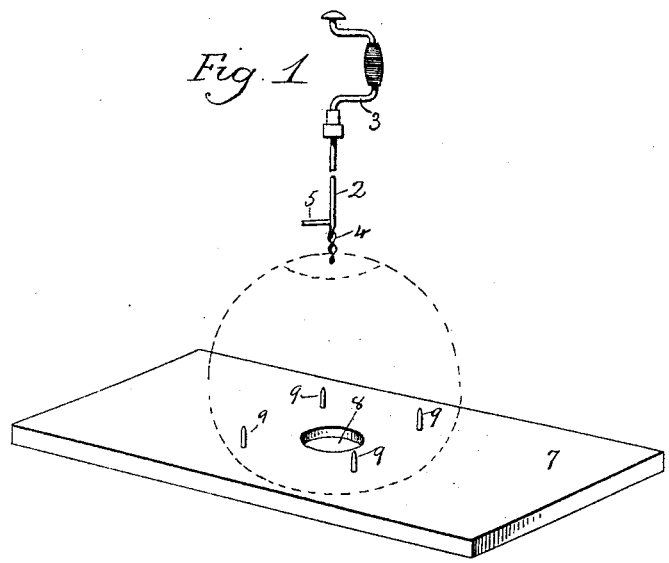
Figure 2:
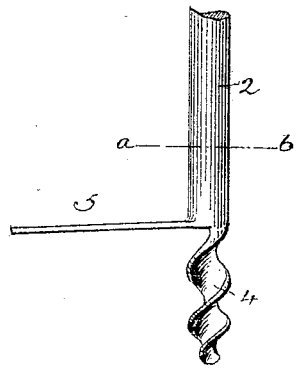
Figure 3:
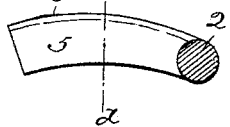
Figure 4:

Figure 1, a perspective view of my improved cabbage-core slicer and cabbage-holder, indicating the parts in their operative position; Fig. 2, a side view of the lower end of the slicer enlarged; Fig. 3, a sectional view on line *a b* of Fig. 2; Fig. 4, a sectional view on line *c d* of Fig. 3.

This invention relates to a device for slicing the core of a cabbage.

In the usual manufacture of sauer-kraut the core of cabbage is entirely removed before the cabbage is sliced, as the core cannot be suitably shredded in an ordinary cutting-machine. For the sake of economy and other purposes it is desirable to retain the core; and the object of this invention is to produce an implement whereby the core may be cut without removing it from the cabbage in such a way that when the cabbage is cut the entire vegetable, including the core, may be cut, so that no part of it is wasted; and the invention consists in the construction as hereinafter described, and particularly recited in the claim.

The core-slicer consists of a shank 2, adapted to be fitted into an ordinary bit-brace 3. The shank at its lower end is formed with a worm-screw 4 and with an outwardly-extending lip 5 above the screw 4. Preferably and as herein shown the lower end of the shank will be split and the portions flattened, one portion being twisted to form the worm-screw 4, while the other portion is flattened and turned outward at a substantial right angle to the shank 2 to form the lip 5. This lip is curved and downwardly beveled at its forward edge, forming a cutting edge 6, while the rear edge of its under face is beveled upward to facilitate the withdrawal of the cutter. While I have stated that the lip 5 is at a substantial right angle to the shank 2, it extends slightly downward from a horizontal plane, so as to make a winding cut.

As a convenient means for holding the cabbage for slicing the core preparatory to cutting I employ a board 7, having a central hole 8 and a series of upwardly-extending pins 9 arranged around the hole. The cabbage is placed over the pins, which hold it against rotation. The screw 4 is then placed in the center of the core and the shank turned by the brace or other convenient means. The screw passing into the core draws the cutter after it, and this cutter slices the core transversely, the screw entering the hole 8 after passing through the cabbage. A reverse movement removes the screw and cutter. When thus prepared, the cabbage is placed in a cutting-machine and shredded in the usual manner, properly slicing or cutting all of the core and permitting the entire vegetable to be shredded, so that no part whatever is wasted.

Having fully described my invention, what I claim as new, and desire to secure by Letters Patent, is—

A cabbage-core slicer comprising a shank bifurcated at its lower end, one portion of the end twisted and forming a worm-screw, the other portion bent outwardly at a substantial right angle to the screw and formed with a cutting edge, substantially as described.

In testimony whereof I have signed this specification in the presence of two subscribing witnesses.

RICHARD ZASTROW.

Witnesses:
J. FRANCIS REYNOLDS,
JULIUS ZASTROW.